United States Patent
Zhu et al.

(10) Patent No.: US 9,652,197 B2
(45) Date of Patent: May 16, 2017

(54) INFORMATION PROCESSING METHOD, ELECTRONIC APPARATUS AND SYSTEM

(71) Applicant: Lenovo (Beijing) Co., Ltd., Beijing (CN)

(72) Inventors: Jingwei Zhu, Beijing (CN); Jianguo Xu, Beijing (CN); Peili Cao, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 0 days.

(21) Appl. No.: 14/870,913

(22) Filed: Sep. 30, 2015

(65) Prior Publication Data

US 2017/0003930 A1    Jan. 5, 2017

(30) Foreign Application Priority Data

Jun. 30, 2015    (CN) .......................... 2015 1 0387526

(51) Int. Cl.
  *H03G 3/20*   (2006.01)
  *G06F 3/16*   (2006.01)
  *H04R 29/00*  (2006.01)

(52) U.S. Cl.
  CPC .......... *G06F 3/165* (2013.01); *H04R 29/001* (2013.01); *H04R 2430/01* (2013.01)

(58) Field of Classification Search
  CPC ........ H04R 25/554; H04R 3/005; H04R 3/00; H04R 1/1083; H04R 2225/55; H04R 25/558; H04R 25/552; H04R 2499/13; H04R 25/50; H04R 2225/41; H04R 2225/43; H04R 2430/01; H04R 25/70; H04R 3/02; H04R 1/1041; H04R 2201/109; H04R 2420/07; H04R 2460/03
  USPC ....... 381/57, 86, 107, 23.1, 353, 354, 56, 66
  See application file for complete search history.

(56) References Cited

U.S. PATENT DOCUMENTS

| | | | | |
|---|---|---|---|---|
| 2014/0140537 | A1* | 5/2014 | Soulodre ................ | H03G 5/005 381/104 |
| 2015/0350398 | A1* | 12/2015 | Joshi .................... | H04M 1/6083 455/569.2 |
| 2016/0284349 | A1* | 9/2016 | Ravindran ............. | G10L 15/20 |

\* cited by examiner

*Primary Examiner* — Akelaw Teshale
(74) *Attorney, Agent, or Firm* — Brinks Gilson & Lione; G. Peter Nichols

(57) ABSTRACT

An information processing method, electronic apparatus, and a system are described where the method includes establishing a connection with a second electronic apparatus; receiving a first control instruction from the second electronic apparatus; parsing the first control instruction, to obtain an adjusting parameter for an audio adjusting unit; adjusting a gain for the audio adjusting unit based on the adjusting parameter; and processing and outputting audio information received from the second electronic apparatus based on the adjusted gain.

8 Claims, 4 Drawing Sheets

INFORMATION PROCESSING METHOD, ELECTRONIC APPARATUS AND SYSTEM

This application claims priority to Chinese Patent Application No. 201510387526.4 filed on Jun. 30, 2015, the entire contents of which are incorporated herein by reference.

The present disclosure relates to a processing technology in an information processing field, more particularly, to an information processing method, an electronic apparatus and a system.

BACKGROUND

With continuous development of science and technology, electronic apparatuses, especially earphones are used by more and more users who care about audio-visual experience, and earphones having a noise canceling function are used and accepted by more users. However, the earphones having the noise canceling function only have two options of enabling and disabling currently, and it is clear that such options cannot adapt to a wide variety of application scenarios, and cannot provide a good user experience for the users.

SUMMARY

An embodiment of the present disclosure provides an information processing method, which is applied to a first electronic apparatus, the method comprising: establishing a connection with a second electronic apparatus; receiving a first control instruction sent from the second electronic apparatus; parsing the first control instruction, to obtain an adjusting parameter for an audio adjusting unit; adjusting a gain for the audio adjusting unit based on the adjusting parameter; processing and outputting audio information received from the second electronic apparatus based on the adjusted gain.

An embodiment of the present disclosure provides an information processing method, which is applied to a second electronic apparatus, the method comprising: establishing a connection with a first electronic apparatus; determining a first control instruction for the first electronic apparatus, wherein, the first control instruction is used for controlling an adjusting parameter of an audio adjusting unit in the first electronic apparatus; sending the first control instruction to the first electronic apparatus through the connection.

An embodiment of the present disclosure provides an electronic apparatus. The electronic apparatus comprises: a first connecting unit, for establishing a connection with a second electronic apparatus; an information processing unit, for receiving a first control instruction sent from the second electronic apparatus, parsing the first control instruction to obtain an adjusting parameter for an audio adjusting unit; an audio adjusting unit, for adjusting a gain for the audio adjusting unit based on the adjusting parameter, processing and outputting audio information received from the second electronic apparatus based on the adjusted gain.

An embodiment of the present disclosure provides an electronic apparatus. The electronic apparatus comprises: a second connecting unit, for establishing a connection with a first electronic apparatus; a controlling unit, for determining a first control instruction for the first electronic apparatus, wherein, the first control instruction is used for controlling an adjusting parameter of an audio adjusting unit in the first electronic apparatus; sending the first control instruction to the first electronic apparatus through the connection established by the second connecting unit.

An embodiment of the present disclosure provides an information processing system. The system comprises a first electronic apparatus and a second electronic apparatus. The first electronic apparatus establishes a connection with a second electronic apparatus; receives a first control instruction from the second electronic apparatus; parses the first control instruction to obtain an adjusting parameter for an audio adjusting unit; adjusts a gain for the audio adjusting unit based on the adjusting parameter; processes and outputs audio information received from the second electronic apparatus based on the adjusted gain. The second electronic apparatus establishes a connection with the first electronic apparatus; determines a first control instruction for the first electronic apparatus, wherein, the first control instruction is used for controlling the adjusting parameter of the audio adjusting unit in the first electronic apparatus; sends the first control instruction to the first electronic apparatus through the connection.

In the information processing method, the electronic apparatus and the system provided by the present disclosure involve, after establishing a connection with a second electronic apparatus, a first control instruction from the second electronic apparatus is received, an adjusting parameter is obtained based on the first control instruction, a gain for the audio adjusting unit is determined based on the adjusting parameter, and the received audio information is processed based on the adjusted gain and then output. So, the first electronic apparatus can control the gain for the audio adjusting unit under the control of the second electronic apparatus, and a manner of adjusting the gain of the first electronic apparatus is added, which makes the first electronic apparatus applicable to more scenes, thus user experience is improved.

DETAILED DESCRIPTION

Hereinafter, the present disclosure will be further illustrated in detail in conjunction with the accompanying drawings and the specific embodiments.

Embodiment I

Figure 1:
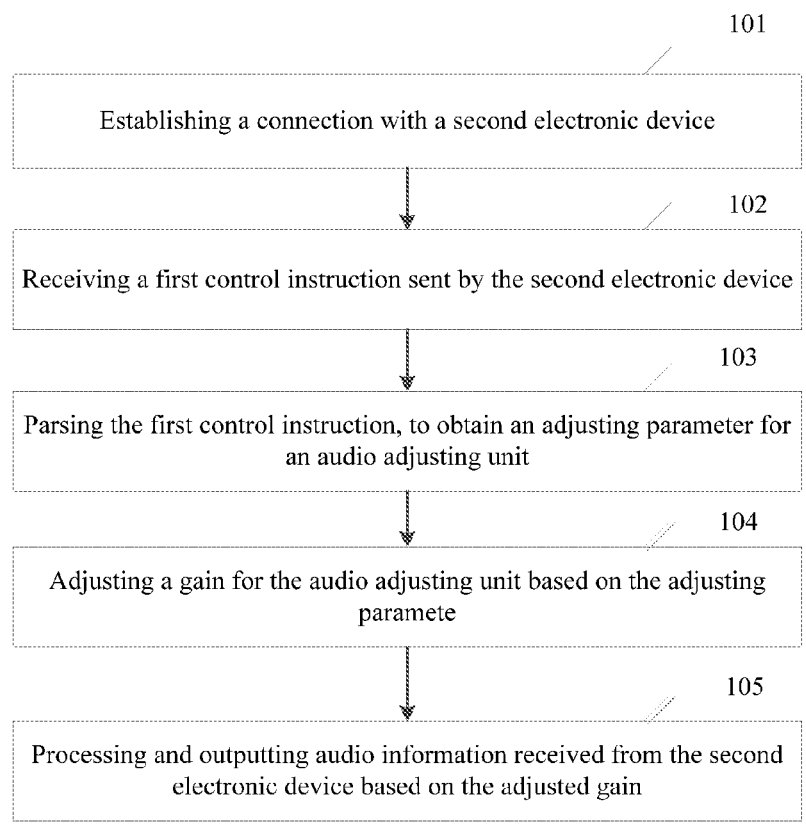
FIG. 1 is a schematic flowchart I of an information processing method according to an embodiment of the present disclosure.

The present embodiment of the present disclosure provides an information processing method, which is applied to a first electronic apparatus. As shown in FIG. 1, and the method comprises steps 101 to 105.

Step 101: establishing a connection with a second electronic apparatus;

Step 102: receiving a first control instruction from the second electronic apparatus;

Step 103: parsing the first control instruction, to obtain an adjusting parameter for an audio adjusting unit;

Step 104: adjusting a gain for the audio adjusting unit based on the adjusting parameter;

Step 105: processing and outputting audio information received from the second electronic apparatus based on the adjusted gain.

Here, the first electronic apparatus is an audio output accessory. The audio output accessory may be an earphone.

In the present embodiment, the establishing a connection with a second electronic apparatus may be establishing a connection through a port of the first electronic apparatus.

The receiving a first control instruction from the second electronic apparatus may be receiving the first control instruction through the connection established between the first electronic apparatus and the second electronic apparatus.

The first control instruction may at least include an adjusting parameter for an audio adjusting unit of the first electronic apparatus. The adjusting parameter may represent a level of gain adjustment for the audio adjusting unit. The first control instruction can use a software protocol algorithm, which is defined by the software, for example, it can be set to represent that the first control instruction is to increase the gain by one step-length value when five pulses are sent in one second, and to represent that the first control instruction is to reduce the gain by one step-length value when seven pulses are sent in one second. However, the earphones in current market only have a function of enabling and disabling noise cancellation, but do not have a function of controlling gains. The step-length value can be set according to the actual situation, for example, it can be set to 1 dB. Or the gain can be set to a percentage value with respect to amplitude, for example, each step-length value is 10% of the amplitude.

The adjusting a gain for the audio adjusting unit based on the adjusting parameter includes: setting an adjusting scale for the amplitude of environmental audio in the audio adjusting unit based on the adjusting parameter, wherein the adjusting scale represents adjustment of gain for the audio adjusting unit.

In the present embodiment, the received audio information may be audio information received from the second electronic apparatus through a port; accordingly, the processing and outputting audio information received from the second electronic apparatus based on the adjusted gain includes: acquiring environmental audio information by a first audio acquiring unit, wherein, the environmental audio information represents audio information of the environment where the first electronic apparatus is located; processing the environmental audio information to obtain a denoising parameter based on the adjusted gain; processing and outputting audio information received from the second electronic apparatus through a first interface by using the denoising parameter.

The manner of processing the environmental audio information to obtain a denoising parameter based on the adjusted gain may be that: the first audio acquiring unit is a denoising mic, and environmental audio is acquired by the first audio acquiring unit. Accordingly, the gain can be an amplitude of adjusting the denoising parameter based on the acquired environmental audio, so that the amplitude of the denoising parameter may be less than or equal to an amplitude of the environmental audio.

Hereinafter, scenes provided by the present embodiment will be illustrated. It is assumed that the first electronic apparatus is an earphone, and the second electronic apparatus may be a smart phone, a tablet computer, a laptop computer, or a desktop computer and so on.

When the earphone is connected with the second electronic apparatus, the second electronic apparatus can be controlled by a user to adjust a gain of an audio adjusting unit of the earphone; after the user selects an adjusting parameter, a first control instruction is generated according to the adjusting parameter selected by the user.

A first control instruction from the second electronic apparatus is received, and the first control instruction is parsed, to obtain an adjusting parameter.

The gain of the audio adjusting parameter is adjusted based on the adjusting parameter.

Then a denoising parameter is calculated and obtained by using the gain and the environmental audio.

The earphone receives audio information from the second electronic apparatus, superimposes the denoising parameter and the audio information to obtain denoised audio information, and output the same.

It can be seen that, by using the above solution, after a connection is established with the second electronic apparatus, a first control instruction from the second electronic apparatus can be received, an adjusting parameter can be obtained based on the first control instruction, a gain of the audio adjusting unit can be determined based on the adjusting parameter, and the received audio information can be processed and outputted based on the adjusted gain. So, the first electronic apparatus can control the gain for the audio adjusting unit under the control of the second electronic apparatus, and a manner of adjusting the gain of the first electronic apparatus is added, which makes the first electronic apparatus applicable to more scenes, thus the user experience is improved.

Embodiment II

The present embodiment of the present disclosure provides an information processing method, which is applied to a first electronic apparatus, as shown in FIG. 1, and the method comprises steps as below.

Step 101: establishing a connection with a second electronic apparatus.

Step 102: receiving a first control instruction from the second electronic apparatus.

Step 103: parsing the first control instruction, to obtain an adjusting parameter for an audio adjusting unit.

Step 104: adjusting a gain for the audio adjusting unit based on the adjusting parameter.

Step 105: processing and outputting audio information received from the second electronic apparatus based on the adjusted gain.

Here, the first electronic apparatus is an audio output accessory. The audio output accessory may be an earphone.

In the present embodiment, the establishing the connection with a second electronic apparatus may be establishing a connection through a port of the first electronic apparatus.

The receiving the first control instruction from the second electronic apparatus may be receiving the first control instruction through a connection established between the first electronic apparatus and the second electronic apparatus.

The first control instruction may at least include an adjusting parameter for an audio adjusting unit of the first electronic apparatus. The adjusting parameter may be used for representing a level of gain adjustment for the audio adjusting unit. The first control instruction can use a software protocol algorithm, and is defined by the software. For example, it can be set to represent that the first control instruction is to increase the gain by one step-length value when five pulses are sent in one second, and to represent that the first control instruction is to reduce the gain by one step-length value when seven pulses are sent in one second. However, the earphones in current market only have a function of enabling and disabling noise cancellation, but do not have a function of controlling gains. The step-length value can be set according to the actual situation, for example, it can be set to 1 dB. Or the gain can be set to a percentage value of amplitude, for example, each step-length value is 10% of the amplitude.

The present embodiment is to illustrate a manner of receiving a first control instruction in detail. That is, the receiving the first control instruction from the second electronic apparatus includes: obtaining an output type of audio information, wherein, the output type of the audio information includes a first output type and a second output type; the first output type being different from the second output type, the first output type represents that the audio information from the second electronic apparatus is received by two audio receiving paths; the second output type represents that the audio information from the second electronic apparatus is received by only one audio receiving path; if the audio information has the first output type, establishing a first information transmission path between a first interface and an information processing unit, and obtaining a first control instruction through the first information transmission path; if the audio information has the second output type, establishing a second information transmission path between the first interface and an information processing unit, and obtaining the first control instruction through the second information transmission path.

Figure 2:
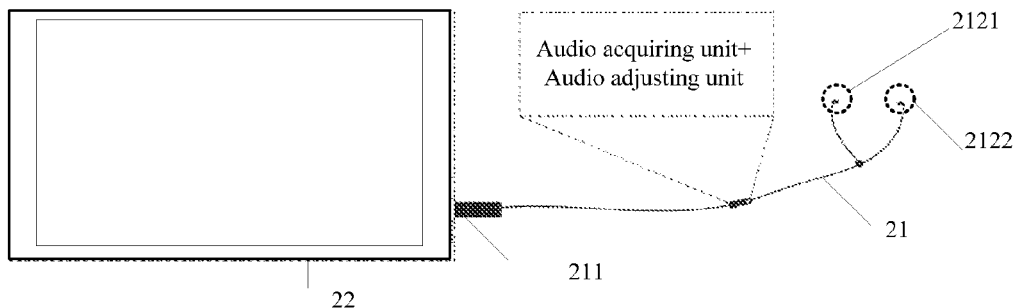
FIG. 2 is a schematic diagram of a connection according to the embodiment of the present disclosure.

For example, as shown in FIG. 2, the first electronic apparatus 21 has two audio output sub-units, specifically, a first audio output sub-unit 2121 and a second audio output sub-unit 2122. The first audio output sub-unit may be a left channel, and the second audio output sub-unit may be a right channel.

In the output type of audio information, the audio information represented by the first output type is outputted by two output sub-units, and the audio information of such output type is usually music; and the second output type often adopts the first output sub-unit, i.e., the left channel for outputting, and such type is usually voice, for example, when a user makes a voice call, the second output type is usually adopted.

Hereinafter, in conjunction with FIGS. 3 to 4, the establishing an information transmission path will be illustrated:

Scene I: It is assumed that the audio information obtained by the first electronic apparatus has the first output type. For example, when a mobile phone is used to listen to music, and left and right channels of the earphone are used, which is a case where the first output sub-unit and the second output sub-unit are used at a same time, but a call MIC, i.e., a second audio acquiring unit, is not used. As show in FIG. 3, the second audio acquiring unit is primarily connected with the second electronic apparatus side through a first interface, but in a case of the first output type, the second audio acquiring unit doesn't work, so a link of the second audio acquiring unit is used to establish a first information transmission path. The above establishing the first information transmission path can be realized by a manner that an information processing unit of the first electronic apparatus controls a switching unit thereof.

Specifically, the second electronic apparatus side outputs an instruction through a second general-purpose input and output port to control the switching unit to connect with a first general-purpose input and output port, and sends a first control instruction to the information processing unit of the first electronic apparatus through the first general-purpose input and output port (GPIO). The first control instruction may be a modulation pulse. Further, the first electronic apparatus parses the first control instruction through the information processing unit, to obtain a corresponding adjusting parameter, and control a noise cancellation gain of the audio adjusting unit based on the adjusting parameter.

Figure 3:
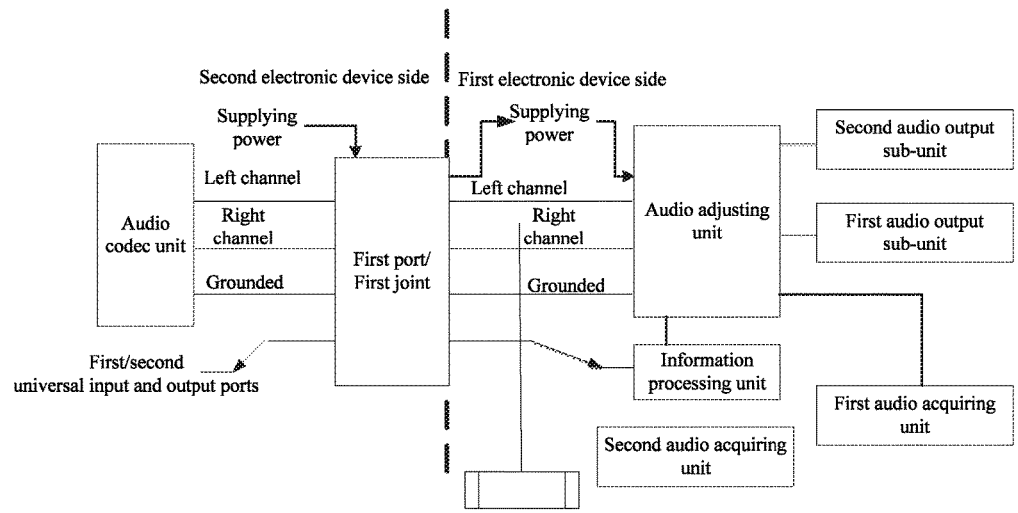
FIG. 3 is a schematic diagram I of establishing a path according to the embodiment of the present disclosure.

In addition, it can be seen from FIG. 3 that, the first electronic apparatus obtains power supply from the second electronic apparatus side through the first interface and supply power to the audio adjusting unit. So, the first electronic apparatus side can be supplied power, that is, the earphone side can be supplied power.

Scene II: It is assumed that the audio information obtained by the first electronic apparatus has a second output type. As show in FIG. 4, when a mobile phone is used for a voice call, only the left channel is needed to transmit audio information, while the right channel of the earphone is not needed to transmit the audio information, and then the second audio acquiring unit can establish a connection with the second electronic apparatus side through a first interface. The above establishing a second information transmission path can be realized by a manner that an information processing unit of the first electronic apparatus controls a switching unit thereof to connect with a path primarily connected with the right channel in the first interface, and a first port of the second electronic apparatus side which primarily establishes a connection with a path of the right channel is controlled to change to establish a connection with a first/third general-purpose input and output port.

Specifically, the second electronic apparatus side outputs an instruction through a third general-purpose input and output port to control the switching unit, so that a first port is connected with the first general-purpose input and output port, and a first control instruction is sent to the information processing unit of the first electronic apparatus through the first general-purpose input and output port (GPIO). The first control instruction may be a modulation pulse. Further, the first electronic apparatus parses the first control instruction through the information processing unit, to obtain a corresponding adjusting parameter, and control a noise cancellation gain of the audio adjusting unit based on the adjusting parameter.

Figure 4:
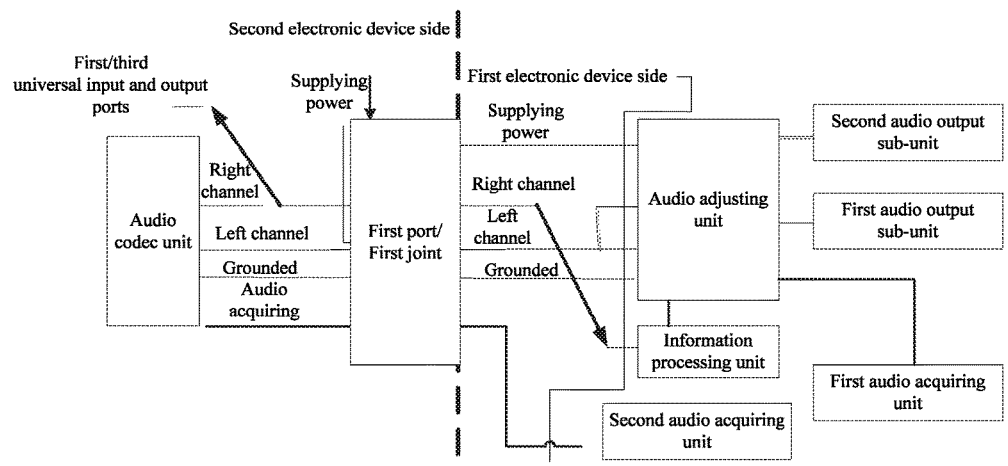
FIG. 4 is a schematic diagram II of establishing a path according to the embodiment of the present disclosure.

In addition, it can be seen from FIG. 4 that, the first electronic apparatus obtains power supply from the second electronic apparatus side through a first interface and supply power to the audio adjusting unit. So, the first electronic apparatus side can be supplied power, that is, the earphone side can be supplied power.

It can be understood that, the switching unit in the present embodiment is not shown in FIGS. 3 to 4, but in fact a control link is established and disconnected by using at least one switch in the first electronic apparatus. In addition, a plurality of switches are used in the second electronic apparatus side to establish a connection between the first port or the first interface and the first, second or third general-purpose input and output port (GPIO).

The adjusting a gain for the audio adjusting unit based on the adjusting parameter includes: setting an adjusting scale for the amplitude of environmental audio in the audio adjusting unit based on the adjusting parameter, wherein, the adjusting scale is just for representing adjustment of gain of the audio adjusting unit.

In the present embodiment, the received audio information may be audio information received from the second electronic apparatus through a port; accordingly, the processing and outputting the audio information received from the second electronic apparatus based on the adjusted gain includes: acquiring environmental audio information by a first audio acquiring unit, wherein, the environmental audio information represents audio information of the environment where the first electronic apparatus is located; processing the environmental audio information to obtain a denoising parameter based on the adjusted gain; processing audio information received from the second electronic apparatus through the first interface by using the denoising parameter, and outputting the denoised audio information by a first audio output sub-unit and/or a second audio output sub-unit.

The manner of processing the environmental audio information to obtain a denoising parameter based on the adjusted gain may be that: the first audio acquiring unit is a denoising mic, and environmental audio is acquired by the first audio acquiring unit. Accordingly, the gain can be an amplitude of adjusting the denoising parameter based on the acquired environmental audio, so that the amplitude of the denoising parameter may be less than or equal to an amplitude of the environmental audio.

It can be seen that, by using the above solution, after a connection is established with the second electronic apparatus, a first control instruction from the second electronic apparatus can be received, an adjusting parameter can be obtained based on the first control instruction, a gain of the audio adjusting unit can be determined based on the adjusting parameter, and the received audio information can be processed and outputted based on the adjusted gain. So, the first electronic apparatus can control the gain of the audio adjusting unit under the control of the second electronic apparatus, and a manner of adjusting the gain of the first electronic apparatus is added, which makes the first electronic apparatus applicable to more scenes, thus the user experience is improved.

Embodiment III

Figure 5:
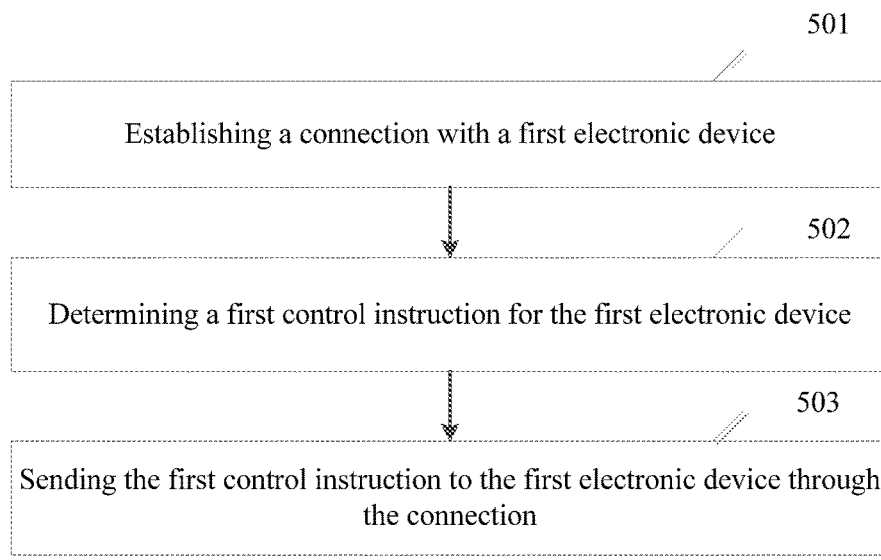
FIG. 5 is a schematic flowchart II of an information processing method according to an embodiment of the present disclosure.

The present embodiment of the present disclosure provides an information processing method, which is applied to a second electronic apparatus, as shown in FIG. 5, and the method comprises steps 501 to 503.

Step 501: establishing a connection with a first electronic apparatus.

Step 502: determining a first control instruction for the first electronic apparatus, wherein, the first control instruction is used for controlling an adjusting parameter of an audio adjusting unit in the first electronic apparatus.

Step 503: sending the first control instruction to the first electronic apparatus through the connection.

Further, after step 503 is completed, the second electronic apparatus further send audio information to the first electronic apparatus.

Here, in the present embodiment, the first electronic apparatus is an audio output accessory. The audio output accessory may be an earphone. The second electronic apparatus may be a smart phone, a tablet computer and so on.

In the present embodiment, the establishing a connection with a second electronic apparatus may be establishing a connection through a first port of the first electronic apparatus. The first control instruction may at least include an adjusting parameter for an audio adjusting unit of the first electronic apparatus; the adjusting parameter may be used for representing a level of gain adjustment for the audio adjusting unit. The first control instruction can use a software protocol algorithm, and is defined by the software. For example, it can be set to represent that the first control instruction is to increase the gain by one step-length value when five pulses are sent in one second, and to represent that the first control instruction is to reduce the gain by one step-length value when seven pulses are sent in one second. However, the earphones in current market only have a function of enabling and disabling noise cancellation, but do not have a function of controlling gains. The step-length value can be set according to the actual situation, for example, it can be set to 1 dB. Or the gain can be set to a percentage value of amplitude, for example, each step-length value is 10% of the amplitude.

The present embodiment further provides a detail description on a manner of receiving a first control instruction by a first electronic apparatus, which includes: obtaining an output type of audio information, wherein, the output type of the audio information includes a first output type and a second output type; the first output type being different from the second output type, the first output type represents that the audio information from the second electronic apparatus is received by two audio receiving paths; the second output type represents that the audio information from the second electronic apparatus is received by only one audio receiving path; if the audio information has the first output type, establishing a first information transmission path between a first interface and an information processing unit, and obtaining the first control instruction through the first information transmission path; if the audio information has the second output type, establishing a second information transmission path between the first interface and the information processing unit, and obtaining the first control instruction through the second information transmission path.

For example, as shown in FIG. 2, the first electronic apparatus 21 has two audio output sub-units, specifically, a first audio output sub-unit 2121 and a second audio output sub-unit 2122. The first audio output sub-unit may be a left channel, and the second audio output sub-unit may be a right channel. In the output type of audio information, the audio information represented by the first output type is outputted by two output sub-units, and the audio information of such output type is usually music. The second output type often adopts the first output sub-unit, i.e., the left channel for outputting, and such type is usually voice. For example, when a user makes a voice call, the second output type is usually adopted.

Hereinafter, the establishing an information transmission path will be illustrated in conjunction with FIGS. 3 to 4.

Scene I: It is assumed that the audio information obtained by the first electronic apparatus has a first output type. For example, when a mobile phone is used to listen to music, and left and right channels of the earphone are used, which is a case where the first output sub-unit and the second output sub-unit are used at a same time, but a call MIC, i.e., a second audio acquiring unit, is not used. As show in FIG. 3, the second audio acquiring unit is primarily connected with the second electronic apparatus side through the first interface, but in a case of the first output type, the second audio acquiring unit doesn't work, so a link of the second audio acquiring unit is used to establish a first information transmission path. The above establishing the first information transmission path can be realized by a manner that an information processing unit of the first electronic apparatus controls a switching unit thereof.

Specifically, the second electronic apparatus side outputs an instruction through a second general-purpose input and output port to control the switching unit to connect with the first general-purpose input and output port path, and sends the first control instruction to the information processing unit of the first electronic apparatus through the first general-purpose input and output port (GPIO). The first control instruction may be a modulation pulse. Further, the first electronic apparatus parses the first control instruction through the information processing unit, to obtain a corresponding adjusting parameter, and control a noise cancellation gain of the audio adjusting unit based on the adjusting parameter.

In addition, it can be seen from FIG. 3 that, the first electronic apparatus obtains power supply from the second electronic apparatus side through the first interface and supply power to the audio adjusting unit. So, the first electronic apparatus side can be supplied power, that is, the earphone side can be supplied power.

Scene II: It is assumed that the audio information obtained by the first electronic apparatus has a second output type. As show in FIG. 4, when a mobile phone is used for a voice call, only the left channel of earphone is needed to transmit audio information, while the right channel of the earphone is not needed to transmit the audio information, and then the second audio acquiring unit can establish a connection with the second electronic apparatus side through the first interface. The above establishing a second information transmission path can be realized by a manner that an information processing unit of the first electronic apparatus controls a switching unit thereof to connect with a path primarily connected with the right channel in the first interface, and a first port of the second electronic apparatus side which primarily establishes a connection with a path of the right channel is controlled to change to establish a connection with a first/third general-purpose input and output port.

Specifically, the second electronic apparatus side outputs an instruction through the third general-purpose input and output port to control the switching unit, so that a first port is connected with the first general-purpose input and output port, and a first control instruction is sent to the information processing unit of the first electronic apparatus through the first general-purpose input and output port (GPIO). The first control instruction may be a modulation pulse. Further, the first electronic apparatus parses the first control instruction through the information processing unit, to obtain a corresponding adjusting parameter, and control a noise cancellation gain of the audio adjusting unit based on the adjusting parameter.

In addition, it can be seen from FIG. 4 that, the first electronic apparatus obtains power supply from the second electronic apparatus side through a first interface and supply power to the audio adjusting unit. So, the first electronic apparatus side can be supplied power, that is, the earphone side can be supplied power.

It can be understood that, the switching unit in the present embodiment is not shown in FIGS. 3 to 4, but in fact a control link is established and disconnected by using at least one switch in the first electronic apparatus. In addition, a plurality of switches are used in the second electronic apparatus side to establish a connection between a first port or a first interface and a first, second or third general-purpose input and output port (GPIO).

It can be understood that, after step 503 is completed in the present embodiment, the first electronic apparatus will adjust a gain of the audio adjusting unit based on the adjusting parameter, which may specifically include: setting an adjusting scale for the amplitude of environmental audio in the audio adjusting unit based on the adjusting parameter, wherein, the adjusting scale is just for representing adjustment of gain of the audio adjusting unit.

In the present embodiment, the received audio information may be audio information received from the second electronic apparatus through the port. Accordingly, the first electronic apparatus will process and output the audio information received from the second electronic apparatus based on the adjusted gain, which includes: acquiring environmental audio information by a first audio acquiring unit, wherein, the environmental audio information represents audio information of the environment where the first electronic apparatus is located; processing the environmental audio information to obtain a denoising parameter based on the adjusted gain; processing audio information received from the second electronic apparatus through the first interface by using the denoising parameter, and outputting the denoised audio information by a first audio output sub-unit and/or a second audio output sub-unit.

The manner of processing the environmental audio information to obtain a denoising parameter based on the adjusted gain may be that: the first audio acquiring unit is a denoising mic, and environmental audio is acquired by the first audio acquiring unit. Accordingly, the gain can an amplitude of adjusting the denoising parameter based on the acquired environmental audio, so that the amplitude of the denoising parameter may be less than or equal to an amplitude of the environmental audio.

It can be seen that, by using the above solution, after a connection is established with the second electronic apparatus, a first control instruction from the second electronic apparatus can be received, an adjusting parameter can be obtained based on the first control instruction, a gain of the audio adjusting unit can be determined based on the adjusting parameter, and the received audio information can be processed and outputted based on the adjusted gain. So, the first electronic apparatus can control the gain for the audio adjusting unit under the control of the second electronic apparatus, and a manner of adjusting the gain of the first electronic apparatus is added, which makes the first electronic apparatus applicable to more scenes, thus the user experience is improved.

Embodiment IV

Figure 6:
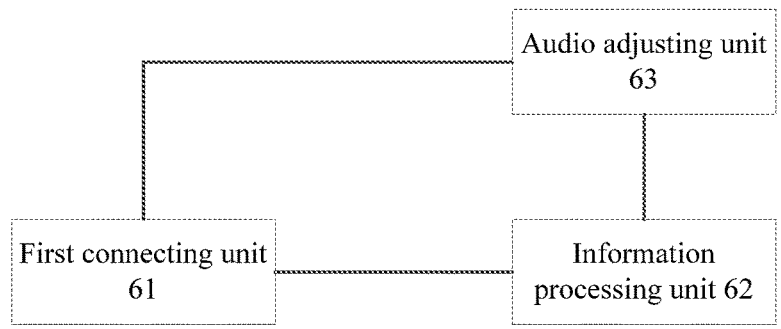
FIG. 6 is a schematic diagram I of a composition structural of an electronic apparatus according to an embodiment of the present disclosure.

The present embodiment of the present disclosure provides an electronic apparatus. As shown in FIG. 6, and the electronic apparatus comprises a first connecting unit 61, an information processing unit 62 and an audio adjusting unit 63.

The first connecting unit 61 is for establishing a connection with a second electronic apparatus.

The information processing unit 62 is for receiving a first control instruction from the second electronic apparatus; parsing the first control instruction, to obtain an adjusting parameter for an audio adjusting unit;

The audio adjusting unit 63 is for adjusting a gain for the audio adjusting unit based on the adjusting parameter; processing and outputting audio information received from the second electronic apparatus based on the adjusted gain.

Here, the first electronic apparatus is an audio output accessory. The audio output accessory may be an earphone. The audio adjusting unit may be an adjusting unit having active noise canceling (ANC) function.

The receiving a first control instruction from the second electronic apparatus may be receiving the first control instruction through a connection established between the first electronic apparatus and the second electronic apparatus.

The first control instruction may at least include an adjusting parameter for an audio adjusting unit of the first electronic apparatus; the adjusting parameter is used for representing a level of gain adjustment for the audio adjusting unit. The first control instruction can use a software protocol algorithm, which is defined by the software. For example, it can be set to represent that the first control instruction is to increase the gain by one step-length value when five pulses are sent in one second, and to represent that the first control instruction is to reduce the gain by one step-length value when seven pulses are sent in one second. However, the earphones in current market only have a function of enabling and disabling noise cancellation, but do not have a function of controlling gains. The step-length value can be set according to the actual situation, for example, it can be set to 1 dB. Or the gain can be set to a percentage value of amplitude, for example, each step-length value is 10% of the amplitude.

The audio adjusting unit is specifically used for setting an adjusting scale for the amplitude of environmental audio in the audio adjusting unit based on the adjusting parameter. The adjusting scale is just for representing adjustment of gain of the audio adjusting unit.

Hereinafter, scenes provided by the present embodiment will be illustrated. It is assumed that the first electronic apparatus is an earphone, and the second electronic apparatus may be a smart phone, a tablet computer, a laptop computer, or a desktop computer and so on.

When the earphone is connected with the second electronic apparatus, the second electronic apparatus can be controlled by a user to adjust a gain of an audio adjusting unit of the earphone. After the user selects an adjusting parameter, a first control instruction is generated according to the adjusting parameter selected by the user;

A first control instruction from the second electronic apparatus is received, and the first control instruction is parsed, to obtain an adjusting parameter;

The gain of the audio adjusting parameter is adjusted based on the adjusting parameter;

Then a denoising parameter is calculated and obtained by using the gain and the environmental audio;

The earphone receives audio information from the second electronic apparatus, superimposes the denoising parameter and the audio information to obtain denoised audio information, and output the same.

It can be seen that, by using the above solution, after a connection is established with the second electronic apparatus, the first control instruction from the second electronic apparatus can be received, an adjusting parameter can be obtained based on the first control instruction, a gain of the audio adjusting unit can be determined based on the adjusting parameter, and the received audio information can be processed and outputted based on the adjusted gain. So, the first electronic apparatus can control the gain for the audio adjusting unit under the control of the second electronic apparatus, and a manner of adjusting the gain of the first electronic apparatus is added, which makes the first electronic apparatus applicable to more scenes, thus the user experience is improved.

Embodiment V

Figure 7:
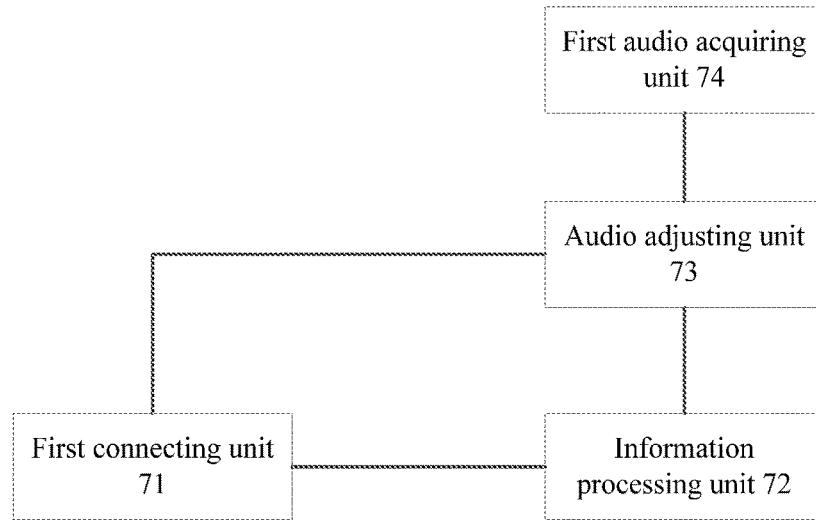
FIG. 7 is a schematic diagram II of a composition structural of an electronic apparatus according to an embodiment of the present disclosure.

The present embodiment of the present disclosure provides an electronic apparatus, as shown in FIG. 7, and the electronic apparatus comprises: a first connecting unit 71, for establishing a connection with a second electronic apparatus; an information processing unit 72, for receiving a first control instruction from the second electronic apparatus, parsing the first control instruction to obtain an adjusting parameter for an audio adjusting unit; an audio adjusting unit 73, for adjusting a gain for the audio adjusting unit based on the adjusting parameter, processing and outputting audio information received from the second electronic apparatus based on the adjusted gain.

Here, the electronic apparatus is an audio output accessory. The audio output accessory may be an earphone.

The first control instruction may at least include an adjusting parameter for an audio adjusting unit of the first electronic apparatus. The adjusting parameter may be used for representing a level of gain adjustment of the audio adjusting unit. The first control instruction can use a software protocol algorithm, and is defined by the software. For example, it can be set to represent that the first control instruction is to increase the gain by one step-length value when five pulses are sent in one second, and to represent that the first control instruction is to reduce the gain by one step-length value when seven pulses are sent in one second. However, the earphones in current market only have a function of enabling and disabling noise cancellation, but do not have a function of controlling gains. The step-length value can be set according to the actual situation, for example, it can be set to 1 dB. Or the gain can be set to a percentage value of amplitude, for example, each step-length value is 10% of the amplitude.

The present embodiment provides a detail description on a manner of receiving a first control instruction, and the information processing unit is specifically used for obtaining an output type of audio information. The output type of the audio information includes a first output type and a second output type; the first output type being different from the second output type. The first output type represents that the audio information from the second electronic apparatus is received by two audio receiving paths. The second output type represents that the audio information from the second electronic apparatus is received by only one audio receiving path. If the audio information has the first output type, it is controlled to establish a first information transmission path between a first interface and an information processing unit, and the first control instruction is obtained through the first information transmission path. If the audio information has the second output type, it is controlled to establish a second information transmission path between the first interface and the information processing unit, and the first control instruction is obtained through the second information transmission path.

For example, as shown in FIG. 2, the first electronic apparatus 21 has two audio output sub-units, specifically, a first audio output sub-unit 2121 and a second audio output sub-unit 2122. The first audio output sub-unit may be a left channel, and the second audio output sub-unit may be a right channel. In the output type of audio information, the audio information represented by the first output type is outputted by two output sub-units, and the audio information of such output type is usually music; and the second output type often adopts the first output sub-unit, i.e., the left channel for outputting, and such type is usually voice, for example, when a user makes a voice call, the second output type is usually adopted.

Hereinafter, the establishing an information transmission path will be illustrated in conjunction with FIGS. 3 to 4.

Scene I: It is assumed that the audio information obtained by the electronic apparatus has a first output type, for example, when a mobile phone is used to listen to music, and left and right channels of the earphone are used, which is a case where the first output sub-unit and the second output sub-unit are used at a same time, but a call MIC, i.e., a second audio acquiring unit, is not used. As show in FIG. 3, the second audio acquiring unit is primarily connected with the second electronic apparatus side through a first interface, but in a case of the first output type, the second audio acquiring unit doesn't work, so a link of the second audio acquiring unit is used to establish the first information transmission path. The above establishing the first information transmission path can be realized by a manner that the information processing unit of the first electronic apparatus controls a switching unit thereof.

Specifically, the second electronic apparatus side outputs an instruction through a second general-purpose input and output port to control the switching unit to connect with a path of first general-purpose input and output port, and sends the first control instruction to the information processing unit of the first electronic apparatus through the first general-purpose input and output port (GPIO). The first control instruction may be a modulation pulse. Further, the first electronic apparatus parses the first control instruction through the information processing unit, to obtain a corresponding adjusting parameter, and control a noise cancellation gain of an audio adjusting unit based on the adjusting parameter.

In addition, it can be seen from FIG. 3 that, the first electronic apparatus obtains power supply from the second electronic apparatus side through the first interface and supply power to the audio adjusting unit. So, the first electronic apparatus side can be supplied power, that is, the earphone side can be supplied power.

Scene II: It is assumed that the audio information obtained by the first electronic apparatus has a second output type. As show in FIG. 4, when a mobile phone is used for a voice call, only the left channel is needed to transmit audio information, while the right channel of the earphone is not needed to transmit the audio information, and then the second audio acquiring unit can establish a connection with the second electronic apparatus side through the first interface. The above establishing a second information transmission path can be realized by a manner that an information processing unit of the first electronic apparatus controls a switching unit thereof to connect with a path primarily connected with the right channel in the first interface, and a first port of the second electronic apparatus side which primarily establishes a connection with a path of the right channel is controlled to change to establish a connection with the first/third general-purpose input and output port.

Specifically, the second electronic apparatus side outputs an instruction through the third general-purpose input and output port to control the switching unit, so that a first port is connected with the first general-purpose input and output port, and the first control instruction is sent to the information processing unit of the first electronic apparatus through the first general-purpose input and output port (GPIO). The first control instruction may be a modulation pulse. Further, the first electronic apparatus parses the first control instruction through the information processing unit, to obtain a corresponding adjusting parameter, and control a noise cancellation gain of the audio adjusting unit based on the adjusting parameter.

In addition, it can be seen from FIG. 4 that, the first electronic apparatus obtains power supply from the second electronic apparatus side through a first interface and supply power to the audio adjusting unit. So, the first electronic apparatus side can be supplied power, that is, the earphone side can be supplied power.

It can be understood that, the switching unit in the present embodiment is not shown in FIGS. 3 to 4, but in fact a control link is established and disconnected by using at least one switch in the first electronic apparatus. In addition, a plurality of switches are used in the second electronic apparatus side to establish a connection between the first port or the first interface and the first, second or third general-purpose input and output port (GPIO).

The adjusting the gain for the audio adjusting unit based on the adjusting parameter includes: setting an adjusting scale for the amplitude of environmental audio in the audio adjusting unit based on the adjusting parameter, wherein, the adjusting scale is just for representing adjustment of gain for the audio adjusting unit.

In the present embodiment, the electronic apparatus further comprises: a first audio acquiring unit 74, for acquiring environmental audio information. The environmental audio information represents audio information of the environment where the first electronic apparatus is located. The audio adjusting unit 73 specifically processes the environmental audio information to obtain a denoising parameter based on the adjusted gain; processing and outputting audio information received from the second electronic apparatus through the first interface of the first connecting unit by using the denoising parameter.

Figure 8:
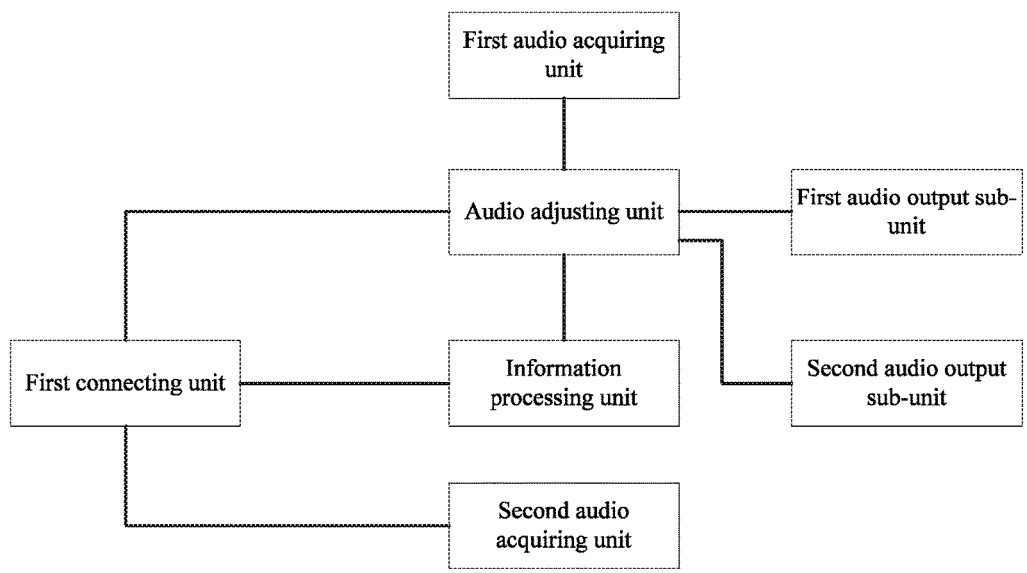
FIG. 8 is a schematic diagram III of a composition structural of an electronic apparatus according to an embodiment of the present disclosure.

Preferably, the electronic apparatus provided by the present embodiment, as shown in FIG. 8, may further comprise a first audio output sub-unit and a second audio output sub-unit besides a first audio acquiring unit, a second audio acquiring unit, an audio adjusting unit and an information processing unit. The first audio acquiring unit is a denosing mic in the present embodiment, and the second audio acquiring unit is a voice mic; the first audio output sub-unit is a left earphone, and the second audio output sub-unit is a right earphone. For example, environmental audio information can be acquired by the first audio acquiring unit, wherein, the environmental audio information represents audio information of the environment where the first electronic apparatus is located; processing the environmental audio information to obtain a denoising parameter based on the adjusted gain; processing audio information received from the second electronic apparatus through a first interface by using the denoising parameter, and outputting the denoised audio information by the first audio output sub-unit and/or the second audio output sub-unit.

The manner of processing the environmental audio information based on the adjusted gain to obtain a denoising parameter may be that: the first audio acquiring unit is a denoising mic, and environmental audio is acquired by the first audio acquiring unit. Accordingly, the gain can be an amplitude of adjusting the denoising parameter based on the acquired environmental audio, so that the amplitude of the denoising parameter may be less than or equal to an amplitude of the environmental audio.

The first connecting unit 71 is specifically used for establishing a connection with the second electronic apparatus through a first interface; and obtaining power supply provided by the second electronic apparatus through the first interface.

It can be seen that, by means of the above solution, after a connection is established with the second electronic apparatus, a first control instruction from the second electronic apparatus can be received, an adjusting parameter can be obtained based on the first control instruction, a gain of the audio adjusting unit can be determined based on the adjusting parameter, and the received audio information can be processed and outputted based on the adjusted gain. So, the first electronic apparatus can control the gain for the audio adjusting unit under the control of the second electronic apparatus, and a manner of adjusting the gain of the first electronic apparatus is added, which makes the first electronic apparatus applicable to more scenes, thus the user experience is improved.

Embodiment VI

Figure 9:
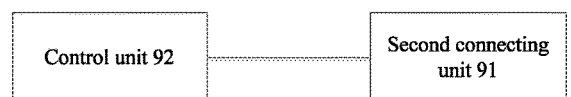
FIG. 9 is a schematic diagram IV of a composition structural of an electronic apparatus according to an embodiment of the present disclosure.

The present embodiment of the present disclosure provides an electronic apparatus. As shown in FIG. 9, the electronic apparatus comprises: a second connecting unit 91, for establishing a connection with a first electronic apparatus; a controlling unit 92, for determining a first control instruction for the first electronic apparatus, wherein, the first control instruction is used for controlling an adjusting parameter of an audio adjusting unit in the first electronic apparatus; sending the first control instructions to the first electronic apparatus through the connection established by the second connecting unit.

Further, the controlling unit 92 will further send audio information to the first electronic apparatus through the connection established by the second connecting unit 91.

Here, in the present embodiment, the first electronic apparatus is an audio output accessory. The audio output accessory may be an earphone. The electronic apparatus may be a smart phone, a tablet computer and so on.

The second connecting unit 91 in the present embodiment can establish a connection through a first port.

The first control instruction may at least include an adjusting parameter for an audio adjusting unit of the first electronic apparatus. The adjusting parameter may be used for representing a level of gain adjustment for the audio adjusting unit. The first control instruction can use a software protocol algorithm, and is defined by the software, for example, it can be set to represent that the first control instruction is to increase the gain by one step-length value when five pulses are sent in one second, and to represent that the first control instruction is to reduce the gain by one step-length value when seven pulses are sent in one second. However, the earphones in current market only have a function of enabling and disabling noise cancellation, but do not have a function of controlling gains. The step-length value can be set according to the actual situation, for example, it can be set to 1 dB. Or the gain can be set to a percentage value of amplitude, for example, each step-length value is 10% of the amplitude.

It can be seen that, by using the above solution, after a connection is established, an adjusting parameter can be obtained based on the first control instruction, a gain of the audio adjusting unit can be determined based on the adjusting parameter, and the received audio information can be processed and outputted based on the adjusted gain. So, the first electronic apparatus can control the gain for the audio adjusting unit under the control of the second electronic apparatus, and a manner of adjusting the gain of the first electronic apparatus is added, which makes the first electronic apparatus applicable to more scenes, thus the user experience is improved.

Embodiment VII

Figure 10:
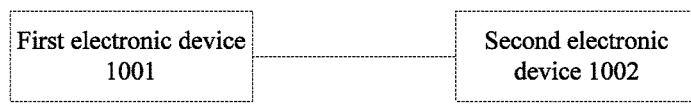
FIG. 10 is a composition schematic diagram of an information processing system according to an embodiment of the present disclosure.

The present embodiment of the present disclosure provides an information processing system. As shown in FIG. 10, the information processing system comprises a first electronic apparatus 1001 and a second electronic apparatus 1002.

The first electronic apparatus 1001 is for establishing a connection with a second electronic apparatus; receiving a first control instruction from the second electronic apparatus; parsing the first control instruction, to obtain an adjusting parameter for an audio adjusting unit; adjusting a gain for the audio adjusting unit based on the adjusting parameter; processing and outputting audio information received from the second electronic apparatus based on the adjusted gain.

The second electronic apparatus 1002 is for establishing a connection with the first electronic apparatus; determining the first control instruction for the first electronic apparatus, wherein, the first control instruction is used for controlling the adjusting parameter of the audio adjusting unit in the first electronic apparatus; sending the first control instruction to the first electronic apparatus through the connection.

Here, the first electronic apparatus 1001 is an audio output accessory. The audio output accessory may be an earphone.

In the present embodiment, the establishing the connection with a second electronic apparatus may be establishing the connection by a port of the first electronic apparatus.

The receiving a first control instruction from the second electronic apparatus may be receiving the first control instruction through a connection established between the first electronic apparatus and the second electronic apparatus.

The first control instruction may at least include an adjusting parameter for an audio adjusting unit of the first electronic apparatus. The adjusting parameter may be used for representing a level of gain adjustment for the audio adjusting unit. The first control instruction can use a software protocol algorithm, and is defined by the software. For example, it can be set to represent that the first control instruction is to increase the gain by one step-length value when five pulses are sent in one second, and to represent that the first control instruction is to reduce the gain by one step-length value when seven pulses are sent in one second. However, the earphones in current market only have a function of enabling and disabling noise cancellation, but do not have a function of controlling gains. The step-length value can be set according to the actual situation, for example, it can be set to 1 dB. Or the gain can be set to a percentage value of amplitude, for example, each step-length value is 10% of the amplitude.

The first electronic apparatus 1001 is used for setting an adjusting scale for the amplitude of environmental audio in the audio adjusting unit based on the adjusting parameter.

The adjusting scale is just for representing adjustment of gain for the audio adjusting unit.

In the present embodiment, the audio information received by the first electronic apparatus 1001 may be audio information received from the second electronic apparatus through a port; accordingly, the first electronic apparatus 1001 is specifically used for acquiring environmental audio information by a first audio acquiring unit, wherein, the environmental audio information represents audio information of the environment where the first electronic apparatus is located; processing the environmental audio information to obtain a denoising parameter based on the adjusted gain; processing audio information received from the second electronic apparatus through a first interface by using the denoising parameter.

A manner of the first electronic apparatus 1001 processing the environmental audio information to obtain a denoising parameter based on the adjusted gain may be that: environmental audio is acquired by the first audio acquiring unit. Accordingly, the gain can be an amplitude of adjusting the denoising parameter based on the acquired environmental audio, so that the amplitude of the denoising parameter may be less than or equal to an amplitude of the environmental audio.

It can be seen that, by using the above solution, after the connection is established with the second electronic apparatus, a first control instruction from the second electronic apparatus can be received, an adjusting parameter can be obtained based on the first control instruction, a gain of the audio adjusting unit can be determined based on the adjusting parameter, and the received audio information can be processed and outputted based on the adjusted gain. So, the first electronic apparatus can control the gain of the audio adjusting unit under the control of the second electronic apparatus, and a manner of adjusting the gain of the first electronic apparatus is added, which makes the first electronic apparatus applicable to more scenes, thus the user experience is improved.

In several embodiments provided by this disclosure, it should be understood that, the disclosed apparatuses may be implemented in other manners. The above-described apparatus embodiments are only exemplary, for example, division of the units is only a logical functional division, and there may be other modes of division when they are actually implemented, for example, a plurality of units or components may be combined, or some features may be omitted. In addition, coupling between the respective components shown or discussed, either direct coupling or communicative connection, may be implemented through some ports, and indirect coupling or communicative connection between the apparatuses or the units may be electrical, mechanical, or in other forms.

The above units described as separate components may be or may not be physically separated, and the components displayed as units may be or may not be physical units, i.e., may be located in one place, or may be distributed in a plurality of network units; and the purpose of this embodiment may be achieved by selecting some or all of the units therein as actually required.

The foregoing embodiments merely are exemplary embodiments of the present disclosure, and not intended to define the scope of the present disclosure; modification or substitution which is easily thought by any person skilled in the art should fall into the protection scope of the present disclosure. Therefore, the protection scope of the present disclosure should be the protection scope of the claims.

The invention claimed is:

1. An information processing method applied to a first electronic apparatus, the method comprises:
   establishing a connection with a second electronic apparatus;
   receiving a first control instruction from the second electronic apparatus;
   parsing the first control instruction to obtain an adjusting parameter for an audio adjusting unit;
   adjusting a gain for the audio adjusting unit based on the adjusting parameter; and,
   processing and outputting audio information received from the second electronic apparatus based on the adjusted gain,
   wherein, the processing and outputting audio information received from the second electronic apparatus based on the adjusted gain comprises:
   obtaining environmental audio information acquired by a first audio acquiring unit, the environmental audio information representing audio information of the environment where the first electronic apparatus is located;
   processing the environmental audio information to obtain a denoising parameter based on the adjusted gain;
   processing and outputting audio information received from the second electronic apparatus through a first interface by using the denoising parameter.

2. The method according to claim 1, wherein the first electronic apparatus is an audio output accessory.

3. The method according to claim 1, wherein the establishing the connection with a second electronic apparatus comprises:
   establishing the connection with the second electronic apparatus through a first interface; and
   obtaining power supply from the second electronic apparatus through the first interface.

4. The method according to claim 1, wherein, the receiving a first control instruction from the second electronic apparatus comprises:
   obtaining an output type of audio information, the output type of the audio information including a first output type and a second output type, the first output type being different from the second output type, the first output type representing that the audio information from the second electronic apparatus is received by two audio receiving paths, the second output type representing that the audio information from the second electronic apparatus is received by only one audio receiving path; wherein
   if the audio information has the first output type, establishing a first information transmission path between a first interface and an information processing unit, and obtaining the first control instruction through the first information transmission path;
   if the audio information has the second output type, establishing a second information transmission path between the first interface and the information processing unit, and obtaining the first control instruction through the second information transmission path.

5. An electronic apparatus, wherein, the electronic apparatus comprises:
   a first connecting unit for establishing a connection with a second electronic apparatus;
   an information processing unit for receiving a first control instruction from the second electronic apparatus and parsing the first control instruction to obtain an adjusting parameter for an audio adjusting unit; and an audio adjusting unit for adjusting a gain for the audio adjusting unit based on the adjusting parameter and processing and outputting audio information received from the second electronic apparatus based on the adjusted gain, a first audio acquiring unit, for acquiring environmental audio information, wherein, the environmental audio information representing audio information of the environment where the first electronic apparatus is located;

the audio adjusting unit processes the environmental audio information to obtain a denoising parameter based on the adjusted gain; and processes and outputs audio information received from the second electronic apparatus through a first interface of a first connecting unit by using the denoising parameter.

6. The electronic apparatus according to claim 5, wherein the first electronic apparatus is an audio output accessory.

7. The electronic apparatus according to claim 5, wherein the first connecting unit is used to establish a connection with the second electronic apparatus through a first interface, and to obtain power supply from the second electronic apparatus.

8. The electronic apparatus according to claim 5, wherein, the information processing unit is used for:

obtaining an output type of audio information, wherein the output type of the audio information includes a first output type and a second output type; the first output type being different from the second output type, the first output type representing that the audio information from the second electronic apparatus is received by two audio receiving paths; the second output type representing that the audio information from the second electronic apparatus is received by only one audio receiving path; and if the audio information has the first output type, establishing a first information transmission path between a first interface and an information processing unit, and obtaining the first control instruction through the first information transmission path;

if the audio information has the second output type, establishing a second information transmission path between the first interface and the information processing unit, and obtaining the first control instruction through the second information transmission path.

* * * * *